United States Patent [19]

Anderson

[11] 4,112,990

[45] Sep. 12, 1978

[54] ENVELOPE

[75] Inventor: Michael Denny Anderson, Meopham, England

[73] Assignee: Versapak International Limited, England

[21] Appl. No.: 768,014

[22] Filed: Feb. 11, 1977

[30] Foreign Application Priority Data

Feb. 18, 1976 [GB] United Kingdom ............. 6380/76

[51] Int. Cl.² ........................................... B65D 55/06
[52] U.S. Cl. ........................................ 150/3; 70/68;
292/282; 292/284; 292/286; 292/307 R
[58] Field of Search ............... 150/3; 70/68; 292/282,
292/283, 284, 285, 286, 307

[56] References Cited

U.S. PATENT DOCUMENTS

| 2,114,683 | 4/1938 | Kates | 150/3 |
|---|---|---|---|
| 2,188,620 | 1/1940 | Boenecke | 70/68 |
| 2,310,627 | 2/1943 | Greene | 150/3 |
| 3,978,697 | 9/1976 | Bako | 190/41 Z |
| 4,008,914 | 2/1977 | Anderson | 70/68 |
| 4,019,353 | 4/1977 | Christopher | 70/68 |
| 4,031,724 | 6/1977 | Atkinson | 70/68 |

Primary Examiner—Ro E. Hart
Attorney, Agent, or Firm—William Anthony Drucker

[57] ABSTRACT

A re-usable envelope having a zip closure which can be locked closed by a sealing device. The sealing device is of plastics material, one part being mounted to the envelope and the other part being engageable therewith, the sealing device only being operable by breaking said other part. The zip tag includes a part for manual engagement to facilitate closing of the sealing device.

3 Claims, 8 Drawing Figures

ENVELOPE

BACKGROUND OF THE INVENTION

The present invention relates to a re-usable envelope.

Re-usable envelopes are generally envelopes of, for example, a plastics material which may be used many times between, for example, different branches of the same business. The advantage of them is that, although initially more expensive than paper or manilla envelopes, they can be used a number of times and the cost of the envelope is very rapidly recouped.

Such re-usable envelopes often have a closure means in the form, for example of a zip closure. It is conventional to provide some kind of sealing device for maintaining the zip closed by holding the tag of the zip in the position in which the zip is closed.

Such sealing devices are normally in two parts, one part being expendable and the other part being retainable for re-use and attached to the envelope. Difficulties have arisen in maintaining the locking part, that is the tag of the zip, in position whilst the expendable part of the seal is inserted into the retained part of the seal.

SUMMARY OF THE INVENTION

It is therefore the object of the present invention to provide improved re-usable envelopes.

It is a second object of the invention to provide re-usable envelopes in which there is provided a sealing apparatus in which the expendable part may be readily inserted into the retained part.

It is a third object of the invention that the locking part of the closure apparatus is arranged so as to be manually holdable in its closed position.

The present invention provides a re-usable envelope having an opening, closure means for closing said opening, and sealing apparatus, the closure means including a locking part which is held in its closed position by the sealing apparatus to seal the closure means closed, the sealing apparatus including two parts, an expendable part and a part mounted on said envelope to be retained for re-use, the expendable part being engageable with the retained part to close the sealing apparatus and being removable to open the sealing apparatus, the expendable part only being removable by being broken, deformed or otherwise damaged so as not to be re-usable, the two parts each having trap surface means to trap therebetween, when the two parts are engaged with one another, the locking part in its closed position, the locking part being shaped to include finger engagement means extending away from the sealing apparatus whereby the finger engagement means and an adjacent part of the envelope may be engaged between two fingers of one hand to hold together the locking part and the trap surface means of the retained part whilst fingers of the other hand engage the expendable part of the sealing apparatus with the retained part of the sealing apparatus.

The advantage of this arrangement is that it enables the retained part and the locking part to be held securely together whilst the expendable part is engaged with the retained part thereby rendering the engagement process simple and requiring less manual dexterity.

The closure means preferably comprises a zip in which case the locking part comprises a tag of the zip.

The retainable part may be mounted close to the end of the zip.

BRIEF DESCRIPTION OF THE DRAWINGS

Two preferred embodiments of the invention will now be described by way of example and with reference to the accompanying drawings in which.

DESCRIPTION OF THE PREFERRED EMBODIMENT

The present application relates to improvements to the sealing device disclosed in our co-pending U.S. patent Application No. 501,630.

Figure 1:
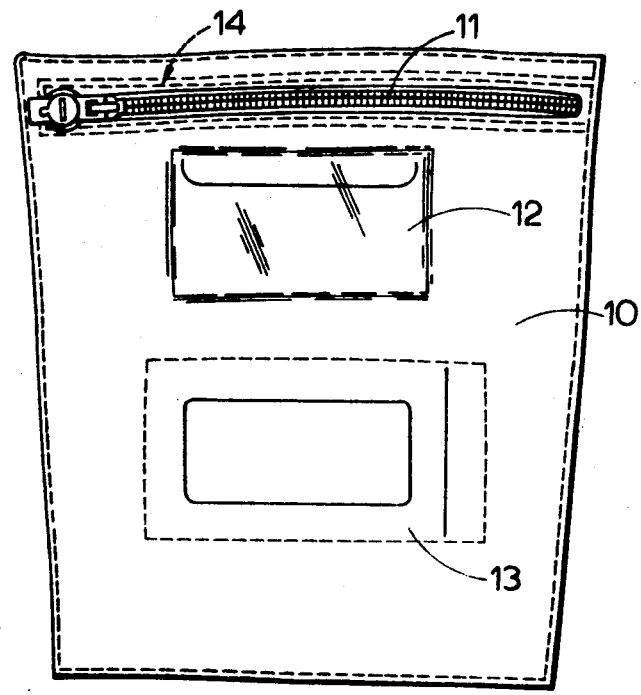
FIG. 1 is a front view of a re-usable envelope incorporating a sealing device of the present invention.

FIG. 1 shows a re-usable envelope 10 of one type to which the invention may be applied. The re-usable envelope may be used, for example, in a business in which there is frequent correspondence between separate branches of the business. To save the cost of using new envelopes each time, an envelope of this type may be used. The envelope is generally of a sheet plastics material or of woven nylon or other fabric and is sealed around three edges, the fourth edge being closable by means of a closure means in the form of a zip fastener 11. There are provided two pockets 12 and 13 in the envelope the pocket 12 being situated on the inner side of the envelope and having a clear plastics front face, this pocket being intended to house a card containing the address to which the envelope is to be sent. The second pocket 13 is attached to the outside of the envelope 10 to carry the necessary postage stamps.

The zip fastener 11 is closed by means of the usual slider 14 carrying a tag 15. These are illustrated in more detail in FIGS. 2 and 3.

Figure 2:
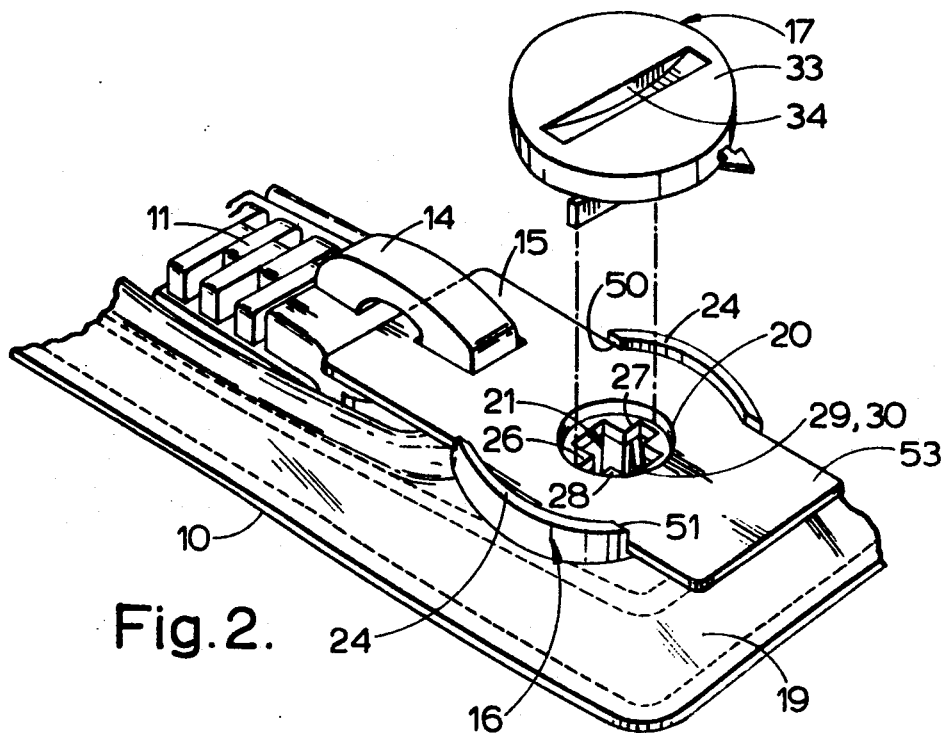
FIG. 2 is a general exploded view showing the sealing device of FIG. 1 before the expendable part is inserted into the retained part.

Referring now to FIG. 2 which shows a view of the top lefthand corner of the envelope of FIG. 1, it can be seen that mounted adjacent the corner of the envelope at the closed end of the zip 11 is a retained part 16 of a sealing device, the expendable part 17 of the apparatus being shown above the retained part 16 before its insertion.

The retained part 16 is permanently mounted on the envelope by means of shoulders (not shown) which grip the underside of the top surface 19 of the envelope.

It will be seen that the tag 15 includes a circular aperture 20 cut therethrough so that when the tag 15 lies on the retained part 16, the aperture 20 generally lies above an aperture 21 through the retained part 16. The aperture 21 passes right through the retained part 16 and opens to the interior of the envelope 10.

Figure 3:
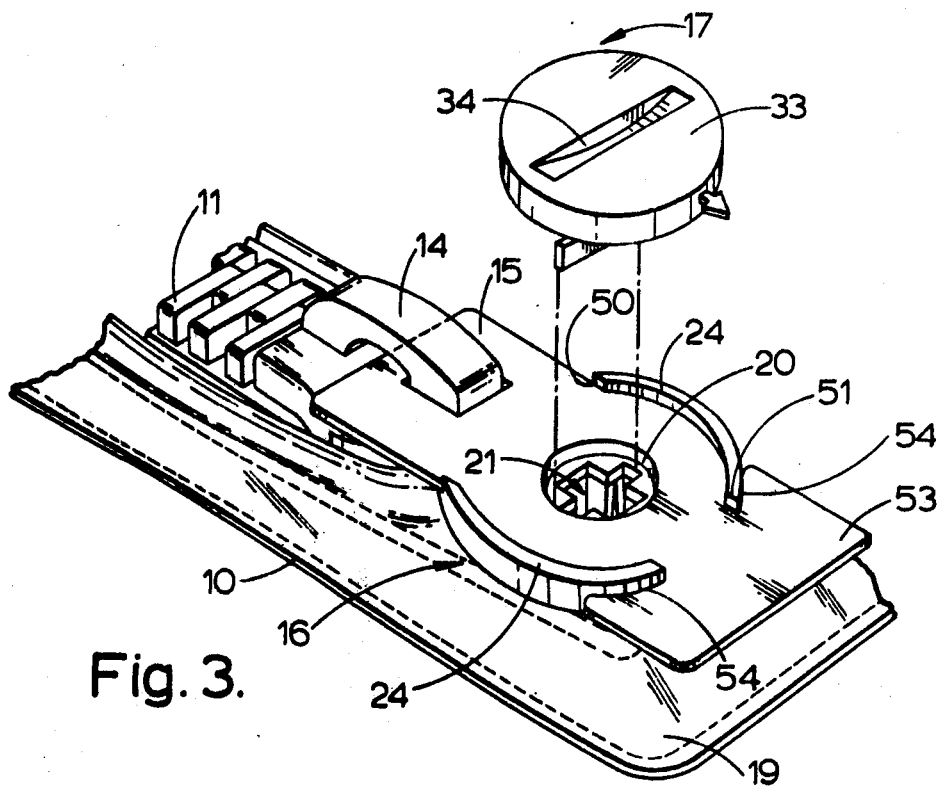
FIG. 3 is a view similar to FIG. 2 of an alternative embodiment and, FIG. 4 is an underside view of the expendable part of the sealing device of FIG. 2.

The retained part 16 incorporates a base surface 26 onto which the tag 15 may be laid in the manner shown in FIGS. 2 and 3, an annular shroud 24 extending upwardly from the periphery of the base surface. The shroud 24 includes a cut-out portion 50 adjacent the end of the zip 11 to allow the tag 15 to lie flat on the base surface 26 and a further cut-out portion 51 on the opposite side of the shroud 24 to the cut-out portion 50.

The aperture 21 mentioned above includes two arms 27, 28 which are generally transverse the line of the zip 11, the two arms 27, 28 including slope portions 29, 30 so that the surface of the arms 27, 28 closest the zip 11 tend to move away from the zip fastener 11 as one passes down through the aperture 21. The bottom of the slope portions 29, 30 comprise shoulders (not shown but corresponding to shoulders 31, 32 of our copending U.S. patent application No. 501,630.

Figure 4:
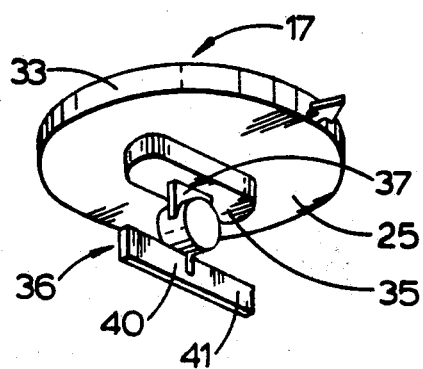

Referring now to FIG. 4 there is illustrated the expendable part 17 of the sealing device of the present invention. The expendable part 17 is of plastics material and comprises a circular head portion 33 having a slot 34 in its top surface of a suitable size and shape to take the edge of a coin. As the thickness of the head portion 33 is small, it has been found necessary to provide a boss 35 on the underside surface 25 of the head portion 33 to provide sufficient depth for the slot 34 provided in the head portion 33.

It can be seen that depending downwardly from the head portion 33 is a tail portion 36. The tail portion 36 is generally rectangularly in horizontal cross section and has a narrowed section 37 adjacent where it meets the head portion 33. Two resilient blade like members 40, 41 extend generally parallel to the coin slot 34 from the end of the tail portion 36 remote from the head portion 33.

The tag 15 of the zip incorporates an extended portion 53 which extends away from the zip on the opposite side to the slot 20. It will be seen that this extended portion 53 in FIGS. 2 and 3 extend through the cut-out portion 51. In the example shown in FIG. 3 the extended portion 53 includes slots 54 for engaging with the adjacent part of the shroud.

The operation of the sealing device in the re-usable envelope will now be described. The material to be sent in the envelope is inserted in the envelope with the zip opened, the correct address is inserted in the pocket 12 and the stamps inserted in the pocket 13.

The zip is then closed and the tag 15 laid on to the base surface 26 with its aperture 20 aligned above the aperture 21. In this position, the extended portion 53 extends beyond the retained part. This is the position shown in FIGS. 2 and 3.

To facilitate the engagement of the expendable part 17 and retained part it is helpful to grip the tag 15 to hold it in engagement with the retained part. This is facilitated by the position of the extended portion 53 which can be gripped, for example, by the thumb, and the back surface of the envelope is gripped by the forefinger of one hand so that the tag 15 and retained part are positively maintained in the position shown in FIGS. 2 and 3.

The extendable part 17 is then inserted in the orientation shown in FIGS. 2 and 3 by the fingers of the other hand so that the tail portion 36 passes through the aperture 20 and into the aperture 21. The blade like members 40, 41 will pass through the arms 27, 28 of the aperture 21. As the expendable part 17 is pushed into the aperture 21, the blade like members 40, 41 engage the slope portions 29, 30 and are resiliently deflected in the same direction away from the zip 11. As the expendable part 17 is further pushed into the aperture 21, the blade like members 40, 41 are further resiliently deflected until when the circular head portion 33 meets the top surface of the tag 15, the blade like members 40, 41 clear the bottom of the slop portions 29, 30 and spring back to their original positions so that they latch under the shoulders at the bottom of the slope portions 29, 30. The expendable part 17 cannot then be removed upwardly as it is securely retained by the engagement of the blade like members 40, 41 with the shoulders. The tag 15 is then maintained in its closed position as it is trapped between two trap surface means in the form of the base surface 26 and the underside surface 25.

The envelope may then be posted or otherwise sent to its destination. When it reaches its destination the operator can insert a screwdriver or coin into the slot 34 and rotate the head portion 33 of the expendable part 17. The tail portion 36 is restrained from rotation by engagement of its rectangular cross-section with the sides of the aperture 21 and so as the head portion 33 is rotated the narrowed section 37 fractures. This allows the head portion 33 to be moved upwardly out of the shroud 24 and the tail portion 36 falls into the interior of the envelope. The envelope may then be opened and re-used as before.

Under certain circumstances, the extended portion 53 may be of sufficient size and suitably mounted so that a finger may be engaged under it to lift the tag 15 to break the seal to disengage the tag. In this case, it is not necessary to use a coin. Such a facility may be useful for example, on internal mail but has the disadvantage that when posted through the usual mail service, there is the possibility of the seal being broken accidentally in transit.

We claim:

1. A re-usable envelope having an opening, closure means for closing said opening, and sealing apparatus, the closure means including a locking part which is held in its closed position by the sealing apparatus to seal the closure means closed, the sealing apparatus including two parts, an expendable part and a part mounted on said envelope to be retained for re-use, the expendable part being engageable with the retained part to close the sealing apparatus and being removable to open the sealing apparatus, the expendable part only being removable by being broken, deformed or otherwise damaged so as not to be re-usable, the two parts each having trap surface means to trap therebetween, when the two parts are engaged with one another, the locking part in its closed position, the locking part being shaped to include finger engagement means extending away from the sealing apparatus whereby the finger engagement means and an adjacent part of the envelope may be engaged between two fingers of one hand to hold together the locking part and the trap surface means of the retained part whilst fingers of the other hand engage the expendable part of the sealing apparatus with the retained part of the sealing apparatus.

2. An envelope as claimed in claim 1 in which the closure means comprises a zip and the locking part comprises a tag of the zip.

3. An envelope as claimed in claim 2 in which the retainable part is mounted adjacent the closed end of the zip.

* * * * *